United States Patent
Oh et al.

(10) Patent No.: US 8,944,499 B2
(45) Date of Patent: Feb. 3, 2015

(54) ARMREST FOR VEHICLE

(71) Applicant: Hyundai Motor Company, Seoul (KR)

(72) Inventors: Man Ju Oh, Gyeonggi-do (KR); Jae Woong Kim, Gyeonggi-do (KR); Jae Woo Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 32 days.

(21) Appl. No.: 13/837,457

(22) Filed: Mar. 15, 2013

(65) Prior Publication Data

US 2014/0175844 A1 Jun. 26, 2014

(51) Int. Cl.
 *A47C 7/72* (2006.01)
 *B60N 2/56* (2006.01)
 *B60N 3/10* (2006.01)
(52) U.S. Cl.
 CPC ............... *B60N 2/5635* (2013.01); *B60N 3/104* (2013.01)
 USPC .................................. 297/180.14; 297/188.14
(58) Field of Classification Search
 CPC ...................................................... B60N 3/104
 USPC ......................................... 297/180.14, 188.14
 See application file for complete search history.

(56) References Cited

U.S. PATENT DOCUMENTS

| | | | |
|---|---|---|---|
| 6,449,958 B1 * | 9/2002 | Foye | 62/3.2 |
| 7,073,338 B2 * | 7/2006 | Harwood et al. | 62/3.61 |
| 7,766,294 B2 * | 8/2010 | Schimmeyer | 248/311.2 |
| 2006/0156739 A1 * | 7/2006 | Wang | 62/3.61 |
| 2007/0204629 A1 * | 9/2007 | Lofy | 62/3.61 |
| 2009/0288800 A1 * | 11/2009 | Kang et al. | 165/42 |

FOREIGN PATENT DOCUMENTS

| | | |
|---|---|---|
| KR | 10-2007-0033190 A | 3/2007 |
| KR | 10-2009-0062181 A | 6/2009 |
| KR | 10-2009-0094484 A | 9/2009 |
| KR | 10-2009-0095192 A | 9/2009 |
| KR | 10-2010-0061172 A | 6/2010 |
| KR | 10-2012-0066212 | 6/2012 |

\* cited by examiner

*Primary Examiner* — Kristina Junge
(74) *Attorney, Agent, or Firm* — Edwards Wildman Palmer LLP; Peter F. Corless

(57) ABSTRACT

The present invention discloses an armrest for a vehicle, the armrest having a front end, a rear end, and two sides; an intake port formed in the front end of an armrest body; an exhaust port formed in the rear end of the armrest body; a blower installed in the armrest body, the blower being connected to the exhaust port by an exhaust duct, and to the intake port by an intake duct, wherein the intake duct is configured to extend rearward from the intake port, branch off into a plurality of diverged parts, and converge prior to connection with the blower; a plurality of cup holders arranged in a row and positioned forward of the blower and proximate to the diverge parts of the intake duct; and a thermoelement disposed on each of the cup holders, the thermoelement being brought into close contact with the intake duct.

12 Claims, 4 Drawing Sheets

ARMREST FOR VEHICLE

CROSS-REFERENCE TO RELATED APPLICATION

This application claims under 35 U.S.C. §119(a) the benefit of Korean Patent Application No. 10-2012-0150325, filed on Dec. 21, 2012 in the Korean Intellectual Property Office, the disclosure of which is incorporated herein in its entirety by reference.

BACKGROUND OF THE INVENTION

1. Field of the Invention

The present invention relates to an armrest for vehicles. More particularly, the present invention relates to an armrest that provides cooling and heating functions.

2. Description of the Related Art

Recently, vehicle cup holders having cooling and heating functions have been extensively researched and installed in vehicles. Such cup holders are typically provided with thermoelements that use electrical energy to provide two kinds of functions including cooling and heating functions. However, to date, there are no commercially viable techniques for effectively mounting cup holders in vehicles and efficiently providing cooling and heating systems for the cup holders.

A representative example of a conventional technique for an armrest with cooling and heating features proposed a cooling and heating box for vehicles which has enhanced cooling and heating efficiency. In detail, the cooling and heating box for vehicles according to this technique is provided with thermoelements. A first surface of each thermoelement is mounted to the perimeter of the bottom of the box. A duct is disposed adjacent to second surfaces of the thermoelements so that when the thermoelements are operated, heat generated from the second surfaces of the thermoelements is exhausted to the outside through the duct. Furthermore, the cooling and heating box further includes a control unit which controls the thermoelements such that when it is desired to use the box as a heating box, the thermoelements are connected in parallel to each other, and when it is desired to use the box as a cooling box, the thermoelements are connected in series to each other. Thereby, when the box is used both as a heating box and as a cooling box, the efficiency can be enhanced. Unfortunately, this conventional technique cannot be optimized for use as an armrest of a rear seat.

Furthermore, it should be noted that the description provided above is merely for aiding in understanding the background of the present invention, and should not be construed as admitted prior art.

SUMMARY OF THE INVENTION

Accordingly, the present invention has been made in an effort to solve the above-described problems associated with the conventional art, and it is an object of the present invention to provide an armrest for a vehicle with a cup holder having cooling and heating functions, thus enhancing the marketability of the vehicle. The armrest of the present invention is configured such that a thermoelement and an air-conditioning line are provided and are effectively arranged so as to provide both cooling and heating functions, while still allowing the armrest to function as a seat back when retracted into a rear seat.

Another object of the present invention is to provide an armrest for a vehicle which is designed such that a pair of cup holders are sufficiently installed in the armrest in a row with respect to the lateral direction of the armrest even though the width of the armrest is comparatively small.

In order to accomplish the above object, the present invention provides an armrest for a vehicle, including: an intake port formed in a front end of an armrest body; an exhaust port formed in a rear end of the armrest body; a blower installed in the armrest body, the blower being connected to the exhaust port by an exhaust duct; a plurality of cup holders arranged in a row ahead of the blower; an intake duct extending from the intake port and branching off into a plurality of diverged parts passing by the respective cup holders, the intake duct being connected to the blower; and a thermoelement disposed on each of the cup holders, the thermoelement positioned to be in close contact with the intake duct.

In an exemplary embodiment, the intake port may be formed in a front surface of the front end of the armrest body. The cup holders may comprise a pair of cup holders arranged in a row in a lateral direction relative to the armrest body. The intake duct may extend from the intake port and may branch off into two diverged parts disposed to contact the respective cup holders. The two diverged parts may extend rearwards around the outer sides of the cup holders and be connected to the blower.

The thermoelements may be disposed on a front end of the corresponding cup holder and may comprise a cooling surface in close contact with the cup holder, and a heat radiation surface in close contact with the exhaust duct. A heat exchange part may be installed in the intake duct, wherein the heat exchange part may be brought into close contact with both of the thermoelements for the cup holders so that the thermoelements share the heat exchange part.

The diverged parts of the intake duct may converge on the blower and be vertically connected to the blower so that the blower intakes air vertically. The exhaust duct may connect horizontally to the exhaust port to the blower so that the blower discharge air horizontally. The cup holder may be disposed in the front end of the armrest body, and the blower may be disposed in the rear end of the armrest body. A grill may be provided on the intake port to prevent a foreign substance from being drawn into the intake port. The exhaust port may communicate with an area outside of a passenger compartment of the vehicle (such as, e.g., the trunk compartment).

The armrest body may be filled with a filler, wherein the filler may be configured to have a space (e.g., an air passageway) through which the intake port or the exhaust port may be connected to the blower, the space forming the intake duct or the exhaust duct.

The exhaust port may be formed in a rear surface of the rear end of the armrest body at a position spaced apart from a lower end of the armrest body by a predetermined distance. The armrest may further include a bellows-shaped external duct extending from the exhaust port to the outside of a passenger compartment of the vehicle. In an armrest for a vehicle according to the present invention, a cup holder having cooling and heating functions can be installed in the armrest, thus further enhancing the marketability of high-end vehicles. Particularly, the armrest may be designed such that a pair of cup holders can be sufficiently installed in the armrest even though the width of the armrest is comparatively small (e.g., the cup holders may be arranged in a side by side configuration). Furthermore, a thermoelement and an air-conditioning line which are provided to realize the cooling and heating functions in the armrest, are effectively arranged so that the cooling and heating performances can be reliably ensured. Moreover, in the present invention, when the armrest is retracted into a seat to function as a seatback, it can provide comfort and ensure safety even when a vehicle accident occurs, thus further enhancing vehicle marketability.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Hereinafter, an armrest for vehicles according to an exemplary embodiment of the present invention will be described in detail with reference to the attached drawings.

Figure 1:
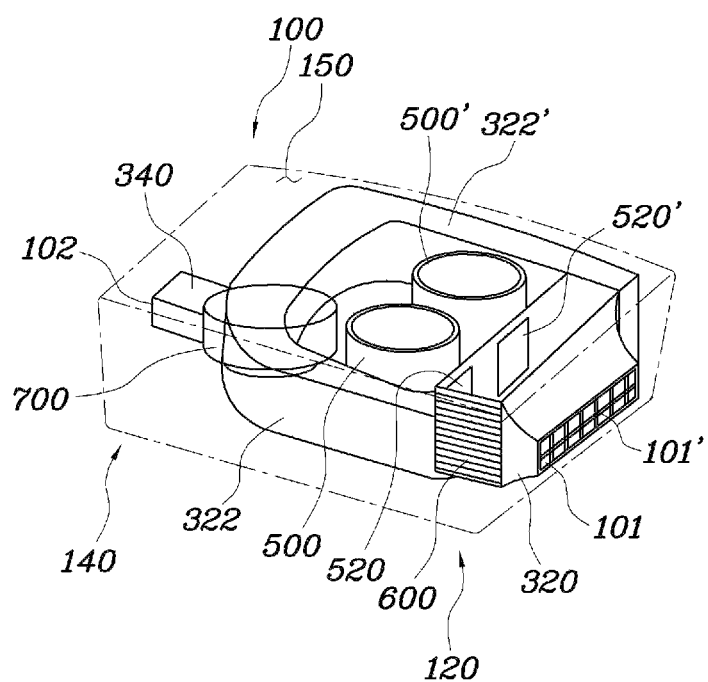
FIG. 1 is a perspective view of an armrest for vehicles, according to an exemplary embodiment of the present invention.
Figure 2:
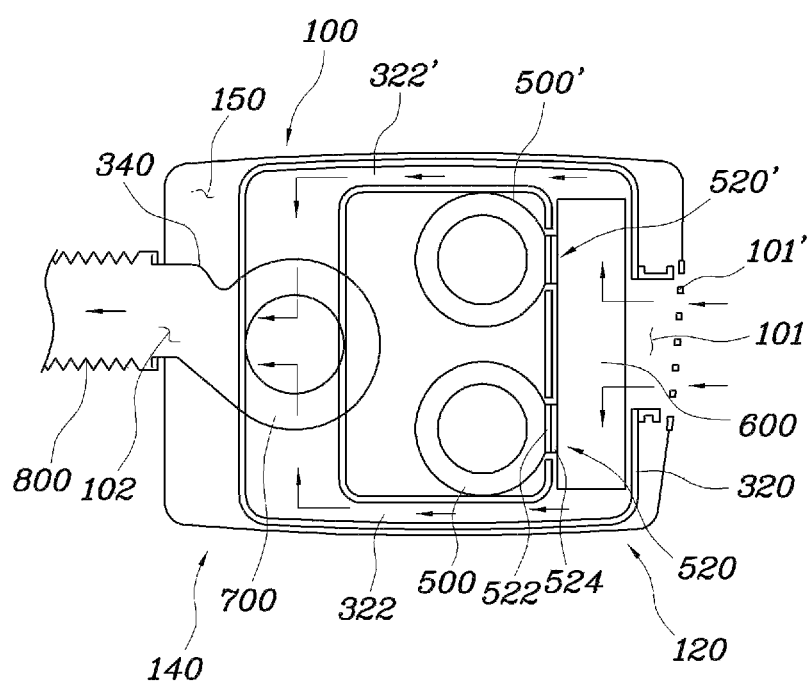
FIG. 2 is a plan view of the armrest of FIG. 1.
Figure 3:
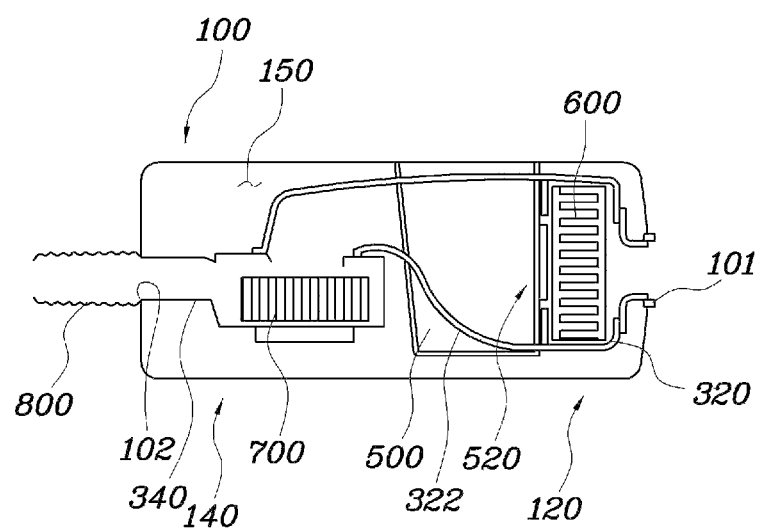
FIG. 3 is a side view of the armrest of FIG. 1.

FIG. 1 is a perspective view of an armrest for vehicles, according to an embodiment of the present invention. FIG. 2 is a plan view of the armrest of FIG. 1. FIG. 3 is a side view of the armrest of FIG. 1.

The armrest according to an exemplary embodiment of the present invention includes an intake port 101, an exhaust port 102, a blower 700, a plurality of cup holders 500, an intake duct 320 and thermoelements 520. The intake port 101 may be formed in a front end of an armrest body 100. The exhaust port 102 may be formed in a rear end 150 of the armrest body 100. The blower 700 may be installed in the armrest body 100 and may be connected to the exhaust port 102 by an exhaust duct 340. The cup holders 500 may be arranged in a row in front of the blower 700. The intake duct 320 extends from the intake port 101 and may branch off into a plurality of parts which pass by the respective cup holders 500 and are connected to the blower 700. The thermoelements 520 are disposed on the respective cup holders 500, and configured to be in close contact with the intake duct 320.

The armrest of the present invention may function as a typical armrest or, alternatively, as a seatback. That is, the armrest body 100 has a rotating shaft in the rear end thereof, which may function as a pivot point to allow the front end of armrest body 100 to pivot up, and retract into, the seat housing armrest body 100. Depending on the rotation of the armrest body 100 around the rotating shaft, when the armrest body 100 is folded and retracted into a seat, the armrest functions as a seatback and, when the armrest body 100 is unfolded from the seat, it functions as an armrest provided with the cooling or heating cup holders 500.

In the case where the armrest is provided in a three-seater rear seat, the armrest must be able to be retracted into the seat and function as a seat back for a middle occupant. Given this, the armrest must be designed such that the cooling and heating systems for cup holders 500 do not hinder the function of the armrest as the seatback, even though the cooling and heating systems may include elements that interface with areas outside of the passenger compartment of the vehicle (e.g., the interior space of the trunk, or the environment external to the vehicle).

The intake port 101 and the exhaust port 102 may be in the armrest and configured to provide cooling and heating functions for the cup holders 500. The intake port 101 is a passage configured to draw air from a passenger compartment into the armrest. Air containing waste heat that has been used for heat exchange may be discharged from the armrest through the exhaust port 102.

In an exemplary embodiment of the present invention, the intake port 101 may be formed in the front surface or upper surface of the front end of the armrest body 100 so that, when the armrest body 100 is retracted into the seat, the intake port 101 is not exposed to the outside (e.g., the passenger compartment proximate to the armrest). That is, if the intake port 101 is exposed to the outside when the armrest is retracted into the seat to function as a seatback rather than being extracted from the seat, it may make the occupant uncomfortable while the armrest is supporting him/her, and if the occupant collides with the armrest, the intake port 101 may become a safety hazard, causing direct contact between it and the occupant.

Therefore, in consideration of comfort and safety, the intake port 101 may be disposed at a location at which it can be prevented from being exposed to the outside (e.g., an exposed surface of the armrest) when the armrest is functioning as a seat back while it is allowed to be exposed to the outside when the armrest is extracted to function as an armrest. For this, the intake port 101 may be disposed in the front surface 122 or the upper surface 124 of the front end 120 of the armrest body 100 rather than in a lower surface of the front end 120, whereby when the armrest is retracted into the seat to function as a seat back, the intake port 101 can be prevented from being exposed to the outside by virtue of being shielded by the seat in which it is retracted (i.e., housed).

Meanwhile, the exhaust port 102 is formed in a rear end 140 of the armrest body 100. In an exemplary embodiment, the exhaust port 102 may be formed in a rear surface of the rear end 140 and configured to communicate with an area outside of the passenger compartment (e.g., a trunk compartment). A bellows-shaped external duct 800 may extend from the exhaust port 102 to the outside of the passenger compartment. Air containing waste heat that has been used for heat exchanger may be exhausted out of the passenger compartment so as to maintain climate control of the passenger compartment (e.g., by not adding heat to a passenger compartment that is being cooled in air-conditioning mode by a climate control system). Specifically, the bellows-shaped external duct 800 may be used to exhaust the air to space below the vehicle or into the trunk. Thereby, when the armrest is retracted into or extracted from the seat, an air passage may be prevented from being blocked.

The exhaust port 102 may be formed in the rear surface of the rear end of the armrest body 100 at a position spaced apart from a lower end of the armrest body 100 by a predetermined distance, so that even when the armrest is retracted into the seat, the external duct 800 is prevented from being blocked or folded and permanently damaged.

Figure 4:
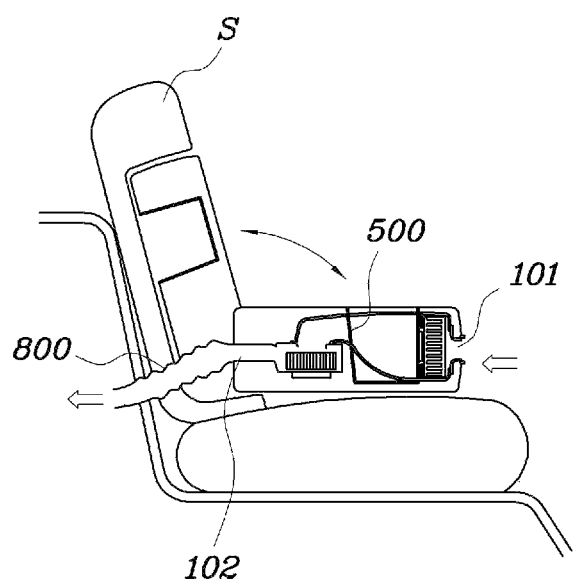
FIG. 4 is a view showing the operation of the armrest of FIG. 1.

FIG. 4 is a view showing the operation of the armrest of FIG. 1. As shown in FIG. 4, when the armrest is extracted from the seat, it functions as an armrest and a cup holder. When the armrest is retracted into the seat, it functions as a seatback of a center rear seat. Waste heat that has been used for heat exchange is exhausted into the trunk of the vehicle or the like by the external duct 800.

Meanwhile, in the case of the exemplary embodiment of the armrest having the above-mentioned construction, it may be necessary to increase the efficiency of an internal air-conditioning system for cooling or heating the cup holder. However, noise or vibrations resulting from the operation should be reduced as much as possible. For example, to reliably cool or heat the cup holders of the armrest, a duct, a blower, and a thermoelement may be required. However, if the duct or the blower is disposed in such a way that flow resistance is significantly increased, noise and vibrations may result. In particular, because the armrest is a place on which a user rests his/her atm, the user may be irritated or annoyed, even by a small noise or vibration from within the armrest. Therefore, an internal system layout may be designed such that the flow resistance can be reduced as much as possible.

In the present invention, the intake port 101 may be formed in the front surface of the front end of the armrest body 100 so that air in the passenger compartment is drawn into the intake port 101. Waste heat may be collected after air-conditioning has been completed. The exhaust port 102 may be formed in the rear end of the armrest body 100 so that the waste heat is exhausted from the exhaust port 102 into an exterior area, such as, the trunk compartment, the exterior environment, or the like.

In an exemplary embodiment, the intake port 101 may be formed in the front surface of the front end of the armrest body 100, and the cup holders 500 may comprise a pair of cup holders 500, which are arranged in a row in a lateral direction of the armrest body 100. The intake duct 320 may extend from the intake port 101 and branch off into two parts which come into contact with the respective cup holders 500 and extend rearwards around the outer sides of the cup holders 500. The diverged parts 322,322' of the intake duct 320 may then converge and be connected to the blower 700. A heat exchange part 600 may be disposed in front of the cup holders 500 so that there is no empty space between the cup holders 500. Thereby, even though the width of the armrest is comparatively small, the two cup holders may be arranged in a row with respect to the lateral direction (i.e., in a side by side configuration).

The thermoelements 520 are provided on the front ends of the respective cup holders 500. A cooling surface 522 of each thermoelement 520 may be brought into close contact with the corresponding cup holder 500, and a heat radiation surface 524 of the thermoelement 520 may be brought into close contact with the intake duct 320. The heat exchange part 600 is installed in the intake duct 320, and may be configured to be brought into close contact with both thermoelements 520 so that the thermoelements 520 share the heat exchange part 600. This shared structure of the heat exchange part 600 may be realized by the thermoelements, which may be Peltier modules functioning as heat pumps. In an exemplary case in which the two cup holders are operated at different temperatures, the efficiency of the heat pump function of the Peltier modules may be further enhanced, thus reducing energy consumption, and further increasing the cooling or heating performance.

The diverged parts 322,322' of the intake duct 320 converge above the blower 700 and are vertically connected to the blower 700 so that the blower 700 intakes air vertically. The exhaust duct 340 connects the exhaust port 102 to the blower 700 so that the blower 700 discharges air horizontally in the rearward direction. In other words, the blower 700 may be configured such that it intakes air vertically and discharges the air horizontally. As such, because the flow of air through the system is bent at a right angle as it enters the blower 700, the intake and exhaust flow of the blower 700 may be facilitated. Advantageously, this may prevent an unwanted increase in flow resistance as a result of the mixture of intake air and exhaust air. In other words, this configuration may prevent a flow resistance from being increased in the blower 700 by mixture of the intake air and the exhaust air, which may be induced when an intake air pressure and an exhaust air pressure are abnormal because the pressure of the passenger compartment is different from that of the exterior of the vehicle.

A grill 101' may be provided on the intake port 101 to prevent foreign substances from being drawn into the intake port 101. The exhaust port 102 communicates with the outside of the passenger compartment of the vehicle. Air containing waste heat that has been used for heat exchange may be exhausted to the outside of the passenger compartment through the exhaust port 102 so that the air-conditioning efficiency of the passenger compartment can be maintained. Particularly, in the present invention, the bellows-shaped external duct 800 may be used to discharge the air to a space below the vehicle or into the trunk. Thereby, when the armrest is retracted into or extracted from the seat, the air passage can be prevented from being blocked.

Furthermore, the armrest body 100 may be filled with a filler. The filler may have spaces through which the intake port 101 and the exhaust ports 102 are connected to the blower 700, thus respectively forming the intake duct 320 and the exhaust ducts 340. This structure may avoid problems which may result from installation of a separate duct in the armrest body 100, for example, an increase in weight, a sense of difference in operation of the armrest, the possibility of the duct striking a person in the vehicle when an accident occurs, generation of noise when the vehicle travels on a rough road, etc.

The exhaust port 102 may be formed in the rear surface of the rear end of the armrest body 100 at a position spaced apart from the lower end of the armrest body 100 by a predetermined distance. Furthermore, the bellows-shaped external duct 800 may extend from the exhaust port 102 to the outside of the passenger compartment. Thereby, air containing waste heat that has been used for heat exchanger is exhausted out of the passenger compartment so as to maintain air-conditioning efficiency of the passenger compartment. Specifically, the bellows-shaped external duct 800 is used to exhaust the air to a space below the vehicle or into the trunk compartment, whereby when the armrest is retracted into or extracted from the seat, an air passage can be prevented from being blocked.

As described above, in an armrest for vehicles according to an exemplary embodiment of the present invention, a cup holder which has cooling and heating functions may be installed in the armrest, thus enhancing the marketability of high-end vehicles. Particularly, the armrest can be designed such that a pair of cup holders can be sufficiently installed in the armrest even though the width of the armrest is comparatively small. Therefore, the marketability of a product can be markedly improved. Furthermore, a thermoelement and an air-conditioning line which are provided to realize the cooling and heating functions are effectively arranged so that the cooling and heating performances can be reliably ensured. Moreover, in the present invention, when the armrest is retracted into a seat to function as a seatback, it can provide comfort and ensure safety even when a vehicle accident occurs, thus further enhancing marketability.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An armrest for a vehicle, comprising:
   an armrest body having a front end, a rear end, and two sides;
   an intake port formed in the front end of the armrest body;
   an exhaust port formed in the rear end of the armrest body;
   a blower installed in the armrest body, the blower being connected to the exhaust port by an exhaust duct, and to the intake port by an intake duct, wherein the intake duct is configured to extend rearward from the intake port, branch off into a plurality of diverged parts, and converge prior to connection with the blower;
   a plurality of cup holders arranged in a row and positioned forward of the blower and proximate to the diverge parts of the intake duct; and
   a thermoelement disposed on each of the cup holders, the thermoelement being brought into close contact with the intake duct,
   wherein the plurality of cup holders comprise a pair of cup holders arranged in a side by side configuration relative to a lateral direction of the armrest body, and
   wherein the intake duct extends rearwardly from the intake port and branches off into two diverged parts coming into contact with the respective cup holders, the two diverged parts extending rearwards around outer sides of the cup holders and converging with one another prior to being connected to the blower.

2. The armrest as set forth in claim 1, wherein the intake port is formed in a front surface of the front end of the armrest body.

3. The armrest as set forth in claim 1, wherein the thermoelement is sandwiched between a front end of the corresponding cup holder and a portion of the exhaust duct.

4. The armrest as set forth in claim 3, wherein a heat exchange part is disposed in the intake duct so that the each thermoelement contacts a portion of the rear surface of the heat exchange part, and configured to transfer heat from the thermoelements to the air passing through the intake duct.

5. The armrest as set forth in claim 1, wherein the diverged parts of the intake duct converge on the blower and are vertically connected to the blower so that the blower intakes air vertically.

6. The armrest as set forth in claim 1, wherein the exhaust duct connects horizontally to the exhaust port to the blower so that the blower discharges air in a horizontal direction.

7. The armrest as set forth in claim 1, wherein the cup holder is disposed in the front end of the armrest body, and the blower is positioned in the rear end of the armrest body.

8. The armrest as set forth in claim 1, wherein the intake port further comprises a grill.

9. The armrest as set forth in claim 1, wherein the exhaust port is in fluid communication with an area outside of a passenger compartment of the vehicle.

10. The armrest as set forth in claim 1, wherein the armrest body is filled with a filler, the filler configured to provide a space which fluidly connects the intake port to the exhaust port, the space forming the internal duct.

11. The armrest as set forth in claim 1, wherein the exhaust port is formed in a rear surface of the rear end of the armrest body at a position spaced apart from a lower end of the armrest body by a predetermined distance.

12. The armrest as set forth in claim 1, comprising
   a bellows-shaped external duct extending from the exhaust port to an outside of a passenger compartment of the vehicle.

* * * * *